(12) United States Patent
Shinozuka

(10) Patent No.: US 6,514,146 B1
(45) Date of Patent: Feb. 4, 2003

(54) LOW VIBRATION SHIELDED BELLOWS SHAFT COUPLING

(76) Inventor: Kinzou Shinozuka, 1-4-7-213 Seishincho, Edogawaku, Tokyo 134-0087 (JP)

(*) Notice: Subject to any disclaimer, the term of this patent is extended or adjusted under 35 U.S.C. 154(b) by 0 days.

(21) Appl. No.: 10/082,151

(22) Filed: Feb. 26, 2002

(51) Int. Cl.[7] .............................................. F16D 3/12
(52) U.S. Cl. ........................................... 464/79; 464/80
(58) Field of Search ............................... 464/79, 80, 88; 285/299; 92/41, 46; 403/50, 362; 138/121

(56) References Cited

U.S. PATENT DOCUMENTS

| | | | | |
|---|---|---|---|---|
| 3,030,465 A | * | 4/1962 | Roeser | |
| 3,090,198 A | * | 5/1963 | Zeisloft | |
| 3,233,428 A | * | 2/1966 | Chalpin | 464/79 |
| 3,250,090 A | * | 5/1966 | Thompson | 464/80 |
| 3,420,553 A | * | 1/1969 | Poxon et al. | 138/121 |
| 3,483,709 A | * | 12/1969 | Baicker et al. | |
| 3,584,093 A | * | 6/1971 | Vernon | |
| 3,623,339 A | * | 11/1971 | Muller | |
| 3,747,367 A | * | 7/1973 | Muller | |
| 4,147,185 A | * | 4/1979 | Hines | 138/121 |
| 4,204,707 A | * | 5/1980 | Lincicome et al. | 138/121 |
| 4,756,639 A | * | 7/1988 | Hoshino | 403/362 X |
| 6,414,328 B1 | * | 7/2002 | Nussupov | |

* cited by examiner

Primary Examiner—Greg Binda
(74) Attorney, Agent, or Firm—Peter Gibson

(57) ABSTRACT

Two opposed bosses each possessing an outwardly open bore for engagement to a shaft end are bonded to either end of a single layer annularly convoluted, bellows style, hollow cylinder shielded by an exteriorly disposed cylindrical rubber sleeve. Torsional rigidity and longitudinal flexibility in torque transfer is provided by the bellows style medial member. The rubber sleeve provides vibration dampening which increases operational velocity and, more significantly, operational life by reducing vibration duration of resonant frequency by an average of fivefold with a cold fitted rubber sleeve, and tenfold with a hot fitting, about the bellows. Hot fitting melts the rubber sleeve and fills the exterior annular grooves of the bellows without the expense of molding under pressure and results in an increase of the resonant frequency and corresponding rotational speed of nearly threefold. Brass is suggested for the opposed bosses and phosphorus bronze for the bellows. Chloroprene rubber is suggested for the sleeve. Nickel plated set screws are suggested for shaft securement.

14 Claims, 3 Drawing Sheets

$$\delta = \log_e x_1/x_2$$

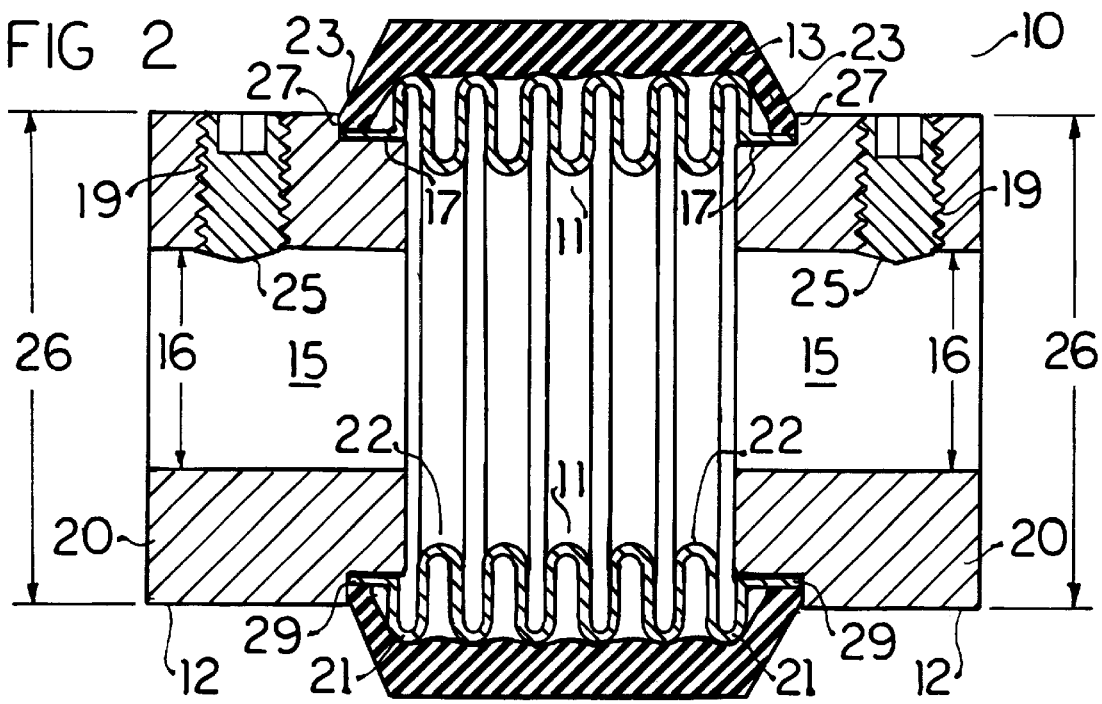
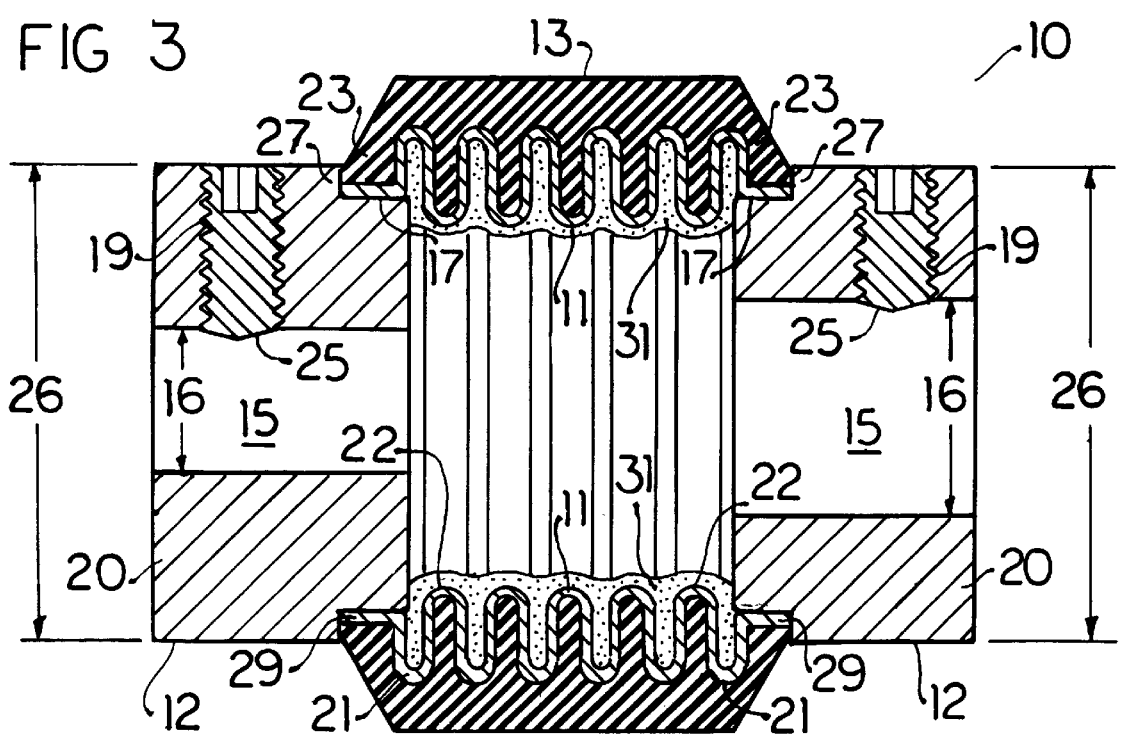

FIG 5
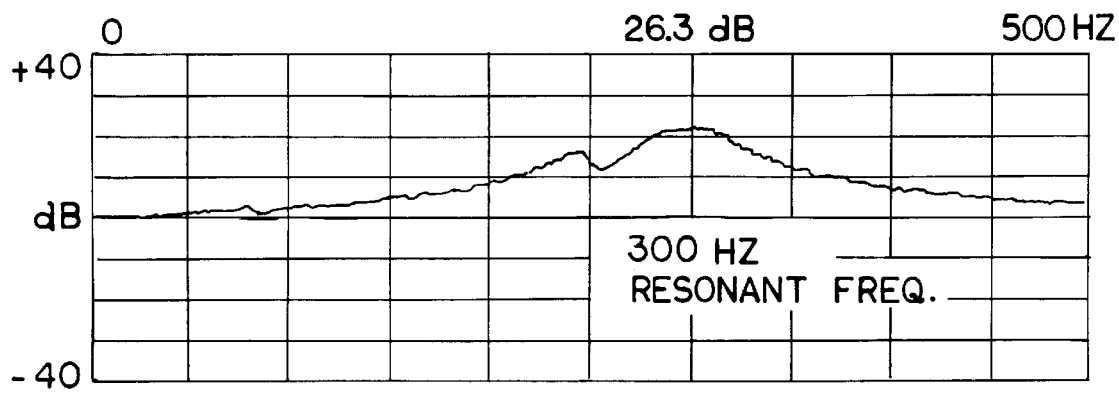
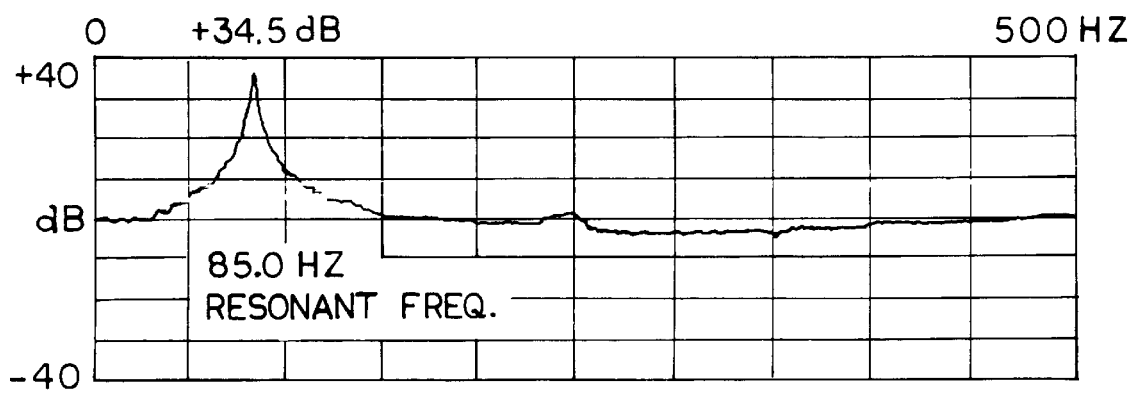
(PRIOR ART) FIG 4 though the scope of this invention should be determined by the following claims and their legal equivalents.

LOW VIBRATION SHIELDED BELLOWS SHAFT COUPLING

BACKGROUND OF THE INVENTION

1. Field of the Invention

The field of the present invention relates generally to flexible shaft couplings, more particularly to bellows style flexible shaft couplings, and most specifically to bellows style flexible shaft couplings further possessing an elastomeric covering.

2. Discussion of the Prior Art

Bellows style flexible shaft couplings are considered to be well known in the art. The annular convolutions of a relatively thin sheet of metal formed into a generally cylindrical shape provide torsional rigidity and longitudinal flexibility. Angular misalignments of up to half a degree are accommodated. U.S. Pat. No. 3,232,076 issued Feb. 1, 1966 to Sundt is an example. Torsional wind-up, i.e. backlash, is considered a problem with increased torsional load.

Rubber or elastomer sleeve shaft connectors are also known. U.S. Pat. No. 2,170,627 issued Aug. 22, 1939 to Berryman, U.S. Pat. No. 2,171,999 issued Sep. 5, 1939 to Weiland and U.S. Pat. No. 2,195,993 issued to Morrill are examples, respectively, of uniform cylindrical, medially enlarged, and medially concave configurations. Vulcanized rubber elements attached at either end to metal shaft bosses generally characterize these couplings. Rubber boots disposed loosely about, i.e. spaced apart from, metal shaft couplings are also well known.

U.S. Pat. No. 3,621,674 issued Nov. 23, 1971 to Ulics and Wheatley discloses a bellows style flexible shaft coupling encased in a molded rubber sleeve in combination with a Cardan style ball joint held in an elastomer socket for the purpose of reducing velocity fluctuations in the latter. U.S. Pat. No. 3,623,339 issued Nov. 30, 1971 to Muller discloses use of two concentrically disposed bellows having elastomer therebetween for the purpose of increasing torsional rigidity and decreasing torsional wind-up. U.S. Pat. No. 3,747,367 issued Jul. 24, 1973 to Muller discloses an improvement in this dual bellows style coupling wherein elastomer is injected between the two thereby alleviating the need for removal of an internal core necessary in molding of the elastomer intermediary layer.

STATEMENT OF NEED

Molding rubber about generally cylindrical bellows style flexible shaft couplings having annular convolutions has been shown to reduce torsional wind-up. Molding rubber about a metal bellows requires a complex pressurized molding however which is an expensive process. Injection of elastomer in between concentrically disposed bellows is simpler and hence less expensive than this type of molding but it still requires pressurization in addition to the use of two bellows instead of one.

In addition to torsional wind-up it is noted that the resonant frequency of a bellows type shaft coupling presents problems at relatively large rotational speeds, i.e. above 3,000 revolutions per minute (rpm), and metal fatigue results which, unchecked, rapidly leads to catastrophic failure, i.e breaking, in common language. Operation is hence effectively limited to the rotational velocity at which resonant frequency obtains. For relatively small shaft couplings, i.e. less than one inch diameter, operating at relatively high speeds this is considered, quite logically, to be a much greater problem than torsional wind-up.

A need is hence discerned for a means of reducing the stress experienced by bellows style flexible shaft couplings during resonant frequency, for extending the operational life and increasing the maximum operational velocity of bellows style flexible shaft couplings, without the expense associated with molding an elastomer about the metal bellows in a pressurized manufacturing operation.

SUMMARY OF THE INVENTION

Objects of the Invention

The encompassing object of the present invention is the enhancement of operational characteristics of a bellows style flexible shaft coupling possessing a single layer metal bellows of generally cylindrical shape without the expense of molding an elastomer about the same.

A principal object of the present invention is to prolong the operational life of a bellows style flexible shaft coupling possessing a single layer metal bellows of generally cylindrical shape without the expense of molding an elastomer about the same.

An ancillary object of the present invention is reducing the duration of resonant frequency experienced by a bellows style flexible shaft coupling possessing a single layer metal bellows of generally cylindrical shape without the expense of molding an elastomer about the same.

Another principal object of the present invention is to increase the maximum operational rotational velocity of a bellows style flexible shaft coupling possessing a single layer metal bellows of generally cylindrical shape without the expense of molding an elastomer about the same.

Another ancillary object of the present invention is increasing the rotational velocity resulting in resonant frequency being experienced by a bellows style flexible shaft coupling possessing a single layer metal bellows of generally cylindrical shape without the expense of molding an elastomer about the same.

Principles Relating to the Present Invention

In achievement of the above stated objects it is suggested that a substantially cylindrical rubber sleeve be disposed about the bellows of a single bellows style flexible shaft coupling without the use of pressurization. A rubber sleeve can be molded to the desired configuration separately from the metal bellows and fitted about the same under ambient conditions. Molding the rubber sleeve alone is much less complicated and hence less expensive than molding the same about the bellows. The rubber sleeve is not bonded to the metal bellows and torsional rigidity is hence unimproved but the rotational velocity at which resonant frequency is encountered is generally increased thereby increasing the maximum operational speed of the coupling. The duration of resonant frequency, moreover, is reduced by a factor of five which results in a commensurate increase in operational life at speeds exceeding the rotational velocity resulting in resonant frequency.

After fitting the rubber sleeve about the bellows appropriate application of heat melts the rubber and adheres the same to the metal bellows without the need for and expense of molding the sleeve about the bellows. The duration of resonant frequency is reduced by a factor often, resulting in a commensurate increase in operational life at speeds exceeding the rotational velocity resulting in resonant frequency, and torsional rigidity is increased thereby reducing torsional wind-up as well. The rubber sleeve can also be applied in a dip molding operation under ambient conditions.

The very considerable expense associated with a compound molding of elastomer about the metal bellows is avoided and both the operational life and maximum operational speed are increased largely owing to the unexpectedly large reduction in the duration of resonant frequency obtained by the dampening of vibration provided by a simple cylindrical rubber sleeve disposed about the metal bellows.

Other benefits and advantages of an embodiment in accordance with the principles relating to the present invention may be appreciated with a reading of the detailed discussion of the preferred embodiment following especially if conducted with reference to the drawings attached hereto and briefly described immediately below.

BRIEF DESCRIPTION OF THE DRAWINGS

FIG. 2 is a cross sectional view of a preferred embodiment in accordance with the principles relating to the present invention depicting a cold fit.

FIG. 3 is a cross sectional view of a preferred embodiment in accordance with the principles relating to the present invention depicting a hot fit.

FIG. 4 is a graphic depiction of PRIOR ART performance characteristics relating to resonant frequency.

FIG. 5 is a graphic depiction of a preferred embodiment performance characteristics relating to resonant frequency.

| NOMENCLATURE | |
|---|---|
| 10 | coupling |
| 11 | bellows |
| 12 | boss(es) |
| 13 | rubber sleeve |
| 15 | shaft bore |
| 16 | shaft bore diameter |
| 17 | peripheral recess |
| 19 | threading |
| 20 | body (of boss) |
| 21 | outward convolution |
| 22 | inward convolution |
| 23 | radial flange |
| 25 | set screw |
| 26 | boss diameter |
| 27 | shoulder |
| 29 | axial flange |
| 31 | silicone rubber |

DETAILED DESCRIPTION OF THE PREFERRED EMBODIMENT

Figure 1:
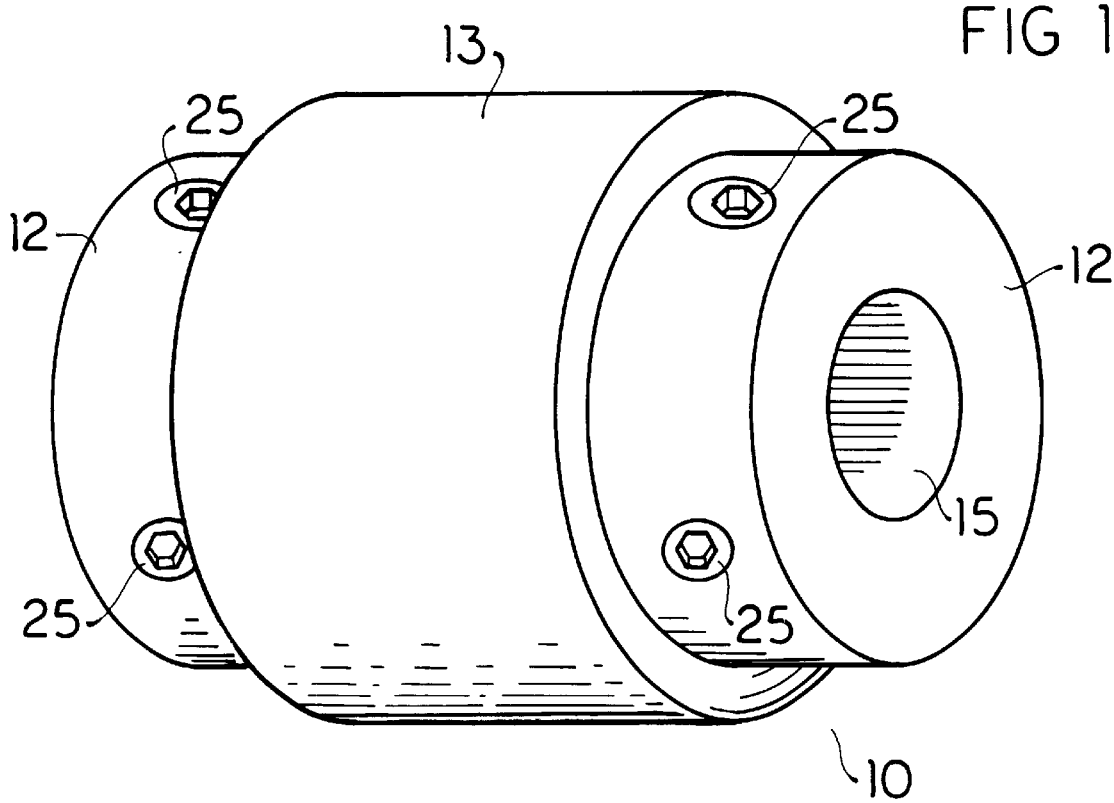
FIG. 1 is an isometric view of a preferred embodiment in accordance with the principles relating to the present invention.

FIG. 1 depicts a shaft coupling 10 in accordance with the principles relating to the present invention possessing two opposed axially aligned terminal bosses 12 longitudinally connected by a bellows 11, as seen in FIGS. 2 & 3, shielded by a rubber sleeve 13 and possessing a shaft bore 15 at either end with which two perpendicular, radially disposed, set screws 25 communicate for securement of the end of a drive shaft, not shown, in the conventional manner. The coupling 10 is seen to possess a substantially cylindrical shape with the medially located rubber sleeve 13 presenting a radially enlarged cylindrical surface. The coupling 10 including the rubber sleeve 13 is substantially symmetric radially and longitudinally with respect to a medial plane normal to the central, rotational, axis. Radial symmetry is important to preserve rotational inertial balance during operation, particularly at relatively high speeds, i.e. above 3,000 rpm, but longitudinal symmetry is unnecessary.

Both shaft bores 15, as clearly seen in FIGS. 2 & 3, are radially symmetric but may vary in diameter 16 from each other, as in FIG. 3, or possess the same diameter 16 as shown in FIG. 2. If the diameters 16 differ than longitudinal symmetry about a medial plane normal the central axis is lacking. This is wholly immaterial to operation. The diameter 16 of each shaft bore 15 is simply determined by the diameter of the shaft intended to be disposed therein and engaged by one or more set screws 25. Use of two perpendicular set screws 25 for each shaft bore 15 is preferred for the same reason that this configuration is commonly used in less expensive shaft couplings: perpendicularly avoids opposition of forces and each set screw 25 can be tightened independently of the other. The set screws 25 must possess and engage threading 19 in adjustable connection to the body 20 of a boss 12 through which each set screw 25 necessarily extends in order to communicate with the shaft bore 15 and contact a shaft disposed therein. Other means for engaging a shaft end inserted into the shaft bore 15 can, moreover, be utilized. The boss 12 can be slotted and traversed by a threaded connector in a collar style engagement which does not mar the shaft and does not require that the body 20 of the boss 12 be made of metal.

Set screws 25 are simply considered the most economic means of engaging the shaft end disposed in a shaft bore 15 of a coupling 10 possessing a metal bellows 11 shielded by a rubber sleeve 13 in accordance with the principles relating to the present invention. The bellows 11 must be metal, preferably phosphorus bronze, and must be connected at either end to a boss 12 which is hence preferably metal as well. The attachment of each end of the metal bellows 12 to one of the two bosses 12 must resist slippage and preserve axial alignment.

It is preferred, as depicted in FIGS. 2 & 3, that each opposed end of the metal bellows 11 comprise a short cylindrical sleeve, known herein as an axial flange 29, fitting about an exterior peripheral recess 17, or reduced diameter 26, of the proximate end of the body 20 of the boss 12 and butted against a shoulder 27 on the outward end of the peripheral recess 17. A peripheral groove about the proximate end of the boss 12 engaged by a peripheral detent in an axial flange 29 of equivalent diameter 26 to the body 20 of the boss 12 is also suggested as a substantially equivalent construction. In any case it is recommended that each end of the metal bellows 11 possess an axial flange 29 permanently bonded to one boss 12. And it is suggested that this bonding be accomplished by soldering or brazing if the bosses 12 are of metal dissimilar to the metal bellows 11 or welding if similar. Phosphorus bronze is specifically recommended for the metal bellows 11, brass for the bosses 12, and soldering for bonding the two together.

The external peripheral recess 17 with resulting shoulder 27 on the end of each boss 12 also, as clearly depicted in FIGS. 2 & 3, preferably captures the distal edge of a radial flange 23 on each end of the rubber sleeve 13. This is not necessary but is considered a simple and elegant construction. It is desirable to prevent displacement of the rubber sleeve 13 but the resilience of elastomeric material readily permits sizing of the rubber sleeve 13 relative the external substantially cylindrical configuration of the metal bellows 11 to ensure compression of the former about the latter preventing accidental displacement. The convoluted configuration of the metal bellows 11 further enhances a friction fit which is not readily displaced and the fitting of the two radial flanges 23 on the ends of the rubber sleeve 13 into the external peripheral recess 17, and against the shoulder 27 adjacent the same, is mainly considered useful in locating the rubber sleeve 13 in the desired location enclosing the exterior of the metal bellows 11 in compressed contact with the same.

This is beneficial regardless of whether a 'hot' or 'cold' fitting is made because in either case the rubber sleeve is molded as a separate piece and fit over the metal bellows 11 after the same has been secured to two opposed bosses 12. In the case of a cold fitting, as depicted in FIG. 2, this completes the assembly of the coupling 10. In the case of a hot fitting, as depicted in FIG. 3, the rubber sleeve 13 is still first cold fitted, substantially as shown in FIG. 2, and then melted with the application of heat thereby filling the exterior annular grooves between the outward convolutions 21 of the metal bellows 11 as seen in FIG. 3 and adhering the rubber sleeve 13 to the exterior of the metal bellows 11 while leaving the interior of the same free including the interior annular grooves between the inward convolutions 22. The configuration depicted in FIG. 3 can also be achieved with a dip molding utilizing appropriate masking of the exterior of the bosses 12. This approach, however, is not preferred for several reasons: it is messy; requires rotation during curing to obtain a satisfactorily radially uniform rubber sleeve 13; and the material is inferior to vulcanized rubber.

With specific regard to the material used in manufacture of the rubber sleeve 13 it is first emphasized that the term 'rubber' connotes an elastomer and that a wide range of elastomers are suitable but the structural integrity obtained with the cross bonding effected during vulcanization is considered highly desirable. The term 'rubber' is used as being more widely understood and substantially equivalent to elastomer. Synthetic rubber is recommended because it costs less than natural rubber. Either is suitable. Chloroprene, also known as Neoprene™, is specifically recommended. It is "chemically and structurally similar to natural rubber, and its mechanical properties are also similar." (*Materials Handbook*, George S. Brady & Henry R. Clauser, McGraw-Hill, Inc., 13$^{th}$ edition, 1991, page 286) Chloroprene also has excellent chemical and oil resistance among other desirable properties and is less expensive than many other synthetic rubbers.

A coupling 10 in accordance with the principles relating to the present invention having a rubber sleeve 13 fitted about a metal bellows 11 possesses superior vibration characteristics in comparison with the equivalent, conventional, bellows style coupling without rubber shielding. Conventional bellows style couplings are characterized by a relatively low resonant frequency, as shown in FIG. 4, and may even have more than one natural resonant frequency. FIG. 4 depicts the performance of a conventional bellows style (PRIOR ART) coupling with a resonant frequency at 85 hertz (HZ) corresponding to a rotational velocity of 5,100 rpm. Resonance greatly increases the stresses upon the coupling and diminishes operational life. Fracture, typically at one of the connections of the metal bellows 11 to the bosses 12, inevitably results from prolonged resonant operation. It is also noted that the decibel peak attained at resonance by a conventional bellows style coupling is quite sharp which is an indication of the severity of the vibration and consequent stress experienced.

FIG. 5 depicts the frequency characteristics of a coupling 10 in accordance with the principles relating to the present invention possessing a hot fitted rubber sleeve 13 as depicted in FIG. 3 which is otherwise identical to the conventional coupling for which frequency characteristics are depicted in FIG. 4. Resonant frequency is seen in FIG. 5 to obtain at 300 HZ which corresponds to a rotational velocity, i.e. shaft speed, of 14,700 rmp, nearly three times the speed of the PRIOR ART. Practical, safe, maximum operational speed is hence increased by 286% in this representative example. And, even more importantly, the severity of the vibration and stress experienced during resonance is seen by the rounded peak connoting resonant frequency, at 26.3 dB, in FIG. 5 to be much less than that characterizing resonance, at 34.5 dB, in the PRIOR ART.

Figure 6:
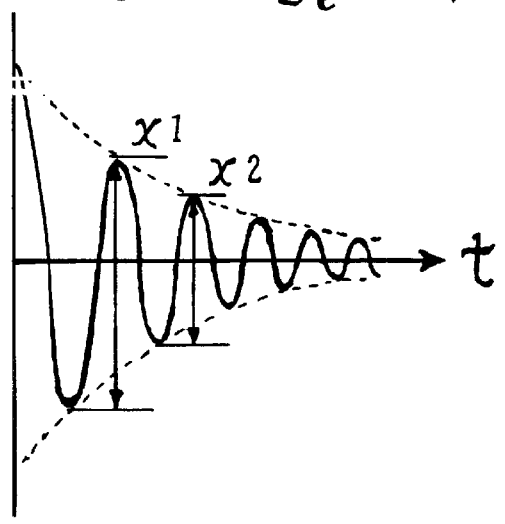
FIG. 6 is a graphic depiction of the damping coefficient $\delta = \log_e(\chi_1/\chi_2)$ as a function of time.

The underlying physical difference is the vibration dampening provided by the rubber sleeve 13 about the metal bellows 11 in a coupling 10 in accordance with the principles relating to the present invention. An exemplary damping coefficient $\delta = \log_e(\chi_1/\chi_2)$ is depicted in FIG. 6 as a function of time. The larger the damping coefficient the more quickly resonance is eliminated and the greater the reduction of vibration generally. PRIOR ART damping coefficients range from 0.03 to 0.04 for three different size bellows style couplings with basic, i.e. boss 12, external diameters 26 of ¾", ⅞", and 1". Couplings 10 in accordance with the principles relating to the present invention possessing a cold fitted rubber sleeve 13 about the metal bellows 11 of the same sizes and of otherwise identical construction possess damping coefficients of 0.37, 0.25, & 0.29, i.e. between six and ten times the PRIOR ART.

Perhaps the most useful measure of the vibration characteristics concerned is the length of (time required to stop resonance. The PRIOR ART coupling obtaining resonance at 85 HZ as depicted in FIG. 4 requires 2.5 seconds to stop resonating. The coupling 10 in accordance with the principles relating to the present invention with a hot fitted rubber sleeve 13 about the metal bellows 11 obtaining resonance at 245 HZ as depicted in FIG. 5 stops resonance in 0.07 seconds or in less than 3 percent of the time required of the PRIOR ART. The average value for a range of PRIOR ART bellows style couplings between ¾" and 1" basic diameter is approximately 1.0 seconds. The average value for the same range of couplings 10 with a cold fitted rubber sleeve 13 about the metal bellows 11 is approximately 0.2 seconds and the average value for the same range of couplings 10 with a hot fitted rubber sleeve 13 about the metal bellows 11 is approximately 0.1 seconds. A coupling 10 in accordance with the principles relating to the present invention with a rubber sleeve 13 fitted about the metal bellows 11 stops resonating five to ten times more quickly than the equivalent PRIOR ART couplings.

It is not intended that couplings 10 in accordance with the principles relating to the present invention possessing a rubber sleeve 13 about the metal bellows 11 be operated at speeds which obtain resonance but rather that these data indicate the extension of operational life gained by the reduction in vibration experienced in normal operation provided by adherence to said principles. The data presented herein were obtained with careful testing of PRIOR ART bellows style couplings and couplings 10 in accordance with the principles relating to the present invention possessing a rubber sleeve 13 about the metal bellows 11 all manufactured by YUNIKA™ Corporation of Tokyo, Japan wherein each was secured to one end of a spindle driven at gradually increasing rotational velocity in accordance with commonly accepted industry practice.

It is noted that couplings 10 in accordance with the principles relating to the present invention possessing a rubber sleeve 13 about the metal bellows 11 accommodate up to 0.5 mm or 2.5 degrees of angular misalignment between drive and driven shafts coupled by the same depending on whether the rubber sleeve 13 is, respectively, hot or cold fitted as the melted rubber in the exterior annular grooves between the outward convolutions 21 essentially retards longitudinal flexure.

It is also noted that silicone rubber 31 which vulcanizes at room temperature may be applied to the interior of the metal bellows 11 of a coupling 10 having a hot fitted rubber sleeve 13 in obtainment of maximum vibration dampening characteristics. Silicon rubber 31 is more expensive than chloroprene rubber but the application of both at ambient pressure is still far more economic than pressurized complex molding of any elastomer about a metal bellows.

Lastly it is noted that couplings 10 made in accordance with the principles relating to the present invention are further characterized by negligible backlash, constant velocity ratio, relatively high torsional rigidity with minimal wind up, and are considered to be ideally suited for precise rotation transmission by stepper and servo motors especially.

The detailed description above, moreover, is intended to provide one practiced in the art with what is considered the best known manner of making and utilizing an embodiment in accordance with the principles relating to the present invention and is not to be interpreted in any manner as restrictive of said principles or the rights and privileges obtained by Letters Patent in protection of the same for which I claim:

1. A flexible rotary shaft coupling comprising:

two substantially cylindrical bosses each bonded to one end of a substantially cylindrical metal bellows possessing inward and outward annular convolutions exteriorly enclosed in compressive contact by a rubber sleeve comprised of a vulcanized elastomer molded in a separate piece from said metal bellows;

each said boss possessing a shaft bore central to a body of the boss through which at least one set screw extends radially and is adjustably threaded for communication with said shaft bore and both said shaft bores being axially aligned by said metal bellows;

said rubber sleeve providing vibration dampening characteristics reducing resonance duration experienced by said flexible rotary shaft coupling and reducing stresses induced by vibration thereby prolonging operational life of said shaft coupling.

2. A shaft coupling in accordance with claim 1 wherein both said shaft bores possess substantially equal diameters.

3. A shaft coupling in accordance with claim 1 wherein both said shaft bores possess different diameters.

4. A shaft coupling in accordance with claim 1 wherein said metal bellows is formed from phosphorus bronze.

5. A shaft coupling in accordance with claim 1 wherein both said bosses are metal.

6. A shaft coupling in accordance with claim 5 having both said bosses bonded to an end of said metal bellows by soldering.

7. A shaft coupling in accordance with claim 1 having two set screws extending radially through each said boss.

8. A shaft coupling in accordance with claim 7 wherein said set screws extending through each said boss are perpendicularly disposed.

9. A shaft coupling in accordance with claim 1 having empty annular grooves between said outward convolutions.

10. A shaft coupling in accordance with claim 1 having annular grooves between said outward convolutions filled by elastomer resulting from melting of said rubber sleeve.

11. A shaft coupling in accordance with claim 10 having annular grooves between said inward convolutions filled with silicone rubber vulcanized at room temperature.

12. A shaft coupling in accordance with claim 1 having an axial flange on each end of said metal bellows concentrically bonded to an exterior peripheral surface of one said boss.

13. A shaft coupling in accordance with claim 12 in which each said exterior peripheral surface of each said boss is comprised of an exterior peripheral recess peripherally bounded by a shoulder.

14. A shaft coupling in accordance with claim 13 having a radial flange on each end of said rubber sleeve fitted into said exterior peripheral recess of one said boss.

* * * * *